(12) United States Patent
Mahakul et al.

(10) Patent No.: US 7,025,031 B2
(45) Date of Patent: Apr. 11, 2006

(54) LOW EMISSION FUEL EFFICIENT DIESEL LOCOMOTIVE ENGINE INCLUDING A PISTON HAVING A TOROIDAL SURFACE

(75) Inventors: Budhadeb Mahakul, Naperville, IL (US); Kenneth M. Sinko, Oak Park, IL (US); Randal K. Albright, Montgomery, IL (US); Frank M. Graczyk, Darien, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 10/476,134

(22) PCT Filed: Apr. 27, 2002

(86) PCT No.: PCT/US02/13411

§ 371 (c)(1),
(2), (4) Date: Oct. 25, 2003

(87) PCT Pub. No.: WO02/088528

PCT Pub. Date: Nov. 7, 2002

(65) Prior Publication Data

US 2004/0129242 A1  Jul. 8, 2004

Related U.S. Application Data

(60) Provisional application No. 60/286,933, filed on Apr. 27, 2001.

(51) Int. Cl.
*F02B 3/00* (2006.01)
(52) U.S. Cl. .................................... 123/193.6
(58) Field of Classification Search ............ 123/193.6, 123/263–285; 92/181 R
See application file for complete search history.

(56) References Cited

U.S. PATENT DOCUMENTS

| | | | | |
|---|---|---|---|---|
| 4,164,913 A | * | 8/1979 | Komiyama et al. | 123/263 |
| 4,311,122 A | * | 1/1982 | Banba et al. | 123/279 |
| 4,953,528 A | * | 9/1990 | Oikawa et al. | 123/276 |
| 6,112,715 A | * | 9/2000 | Nigro et al. | 123/279 |
| 6,513,476 B1 | * | 2/2003 | Liu et al. | 123/193.6 |
| 6,705,273 B1 | * | 3/2004 | Liu et al. | 123/263 |

* cited by examiner

*Primary Examiner*—Marguerite McMahon
(74) *Attorney, Agent, or Firm*—Cook, Alex, McFarron, Manzo, Cummings & Mehler, Ltd.

(57) ABSTRACT

A diesel locomotive engine having a piston with a unique bowl geometry. The bowl is defined in part by a center portion having a partial spherical shape. A cone portion (22) is located adjacent the central portion. An annular toroidal surface (24) is connected to the cone portion (22) and is defined by a toroidal major diameter (Dtm) and a toroidal minor radius (Rtm). A crown rim (26) is connected to the annular toroidal surface (24) and to an upper flat rim face of a sidewall.

2 Claims, 2 Drawing Sheets

LOW EMISSION FUEL EFFICIENT DIESEL LOCOMOTIVE ENGINE INCLUDING A PISTON HAVING A TOROIDAL SURFACE

CROSS-REFERENCE TO RELATED APPLICATIONS

This application claims the benefit of U.S. Provisional Application No. 60/286,933 filed 27 Apr. 2001.

FIELD OF THE INVENTION

The present invention relates to combustion engines, and more particularly to a diesel locomotive engine having a piston with a bowl geometry.

BACKGROUND OF THE INVENTION

The use of a compression ratio piston with higher injection pressures is an acceptable method for achieving emission reduction in a diesel engine. However, raising the compression ratio also creates smoke of particulate matter. Furthermore, increasing the injection pressures results in reduction of particulate with an increase in $NO_x$ emissions.

SUMMARY OF THE INVENTION

The present Invention includes a diesel locomotive engine Including a piston having a unique bowl geometry. A piston according to the present invention includes an upper face having a center portion that is partially spherical In shape. A cone portion is adjacent to the center portion. An annular toroidal surface is formed adjacent to the cone portion and is defined by a toroidal major diameter and a toroidal minor radius. A crown rim is adjacent the annular toroidal surface. The geometry of the piston bowl provides increased compression ratio and at the same time low emissions and high fuel efficiency.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
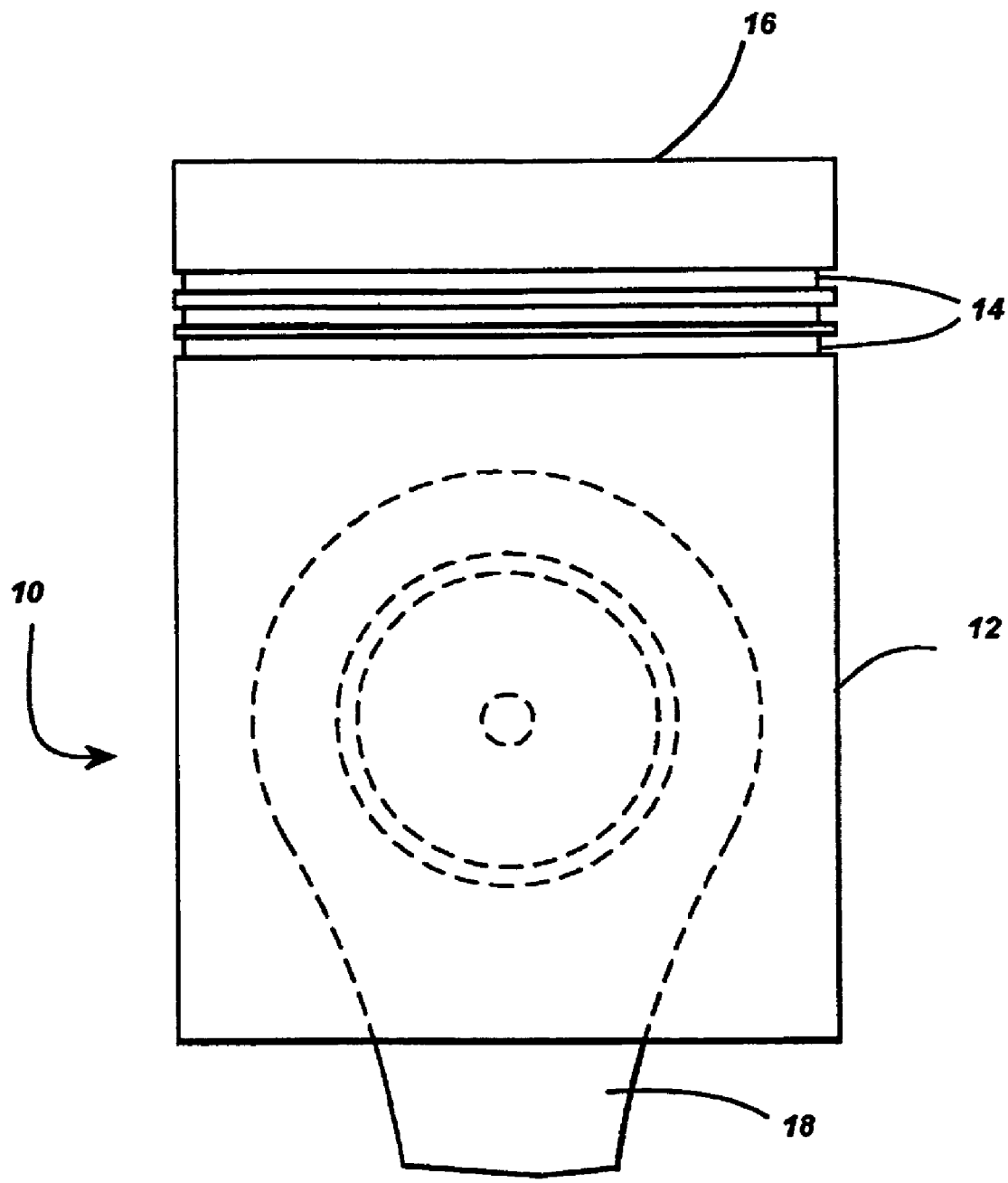
FIG. 1 is an elevational view generally showing the piston of the present invention.

The following description of the preferred embodiment(s) is merely exemplary in nature and is in no way intended to limit the invention, its application, or uses. FIG. 1 shows a piston generally indicated at 10. The piston 10 may be used in an internal combustion engine, such as a locomotive engine. As is known In the art, the engine may have a plurality of cylinders each for receiving a piston 10. The cylinders may be configured in a traditional V-12 design, or any other design.

The piston 10 includes a generally annular sidewall 12 having a plurality of grooves 14 thereon. The grooves are for receiving a plurality of rings to seal the piston 10 against the sidewall of the cylinder, as is well known in the art. The piston 10 also includes a top wall 16 at the top of annular sidewall 12. A connecting rod 18 may also be pivotally secured to the piston 10 in a conventional manner.

Figure 2:
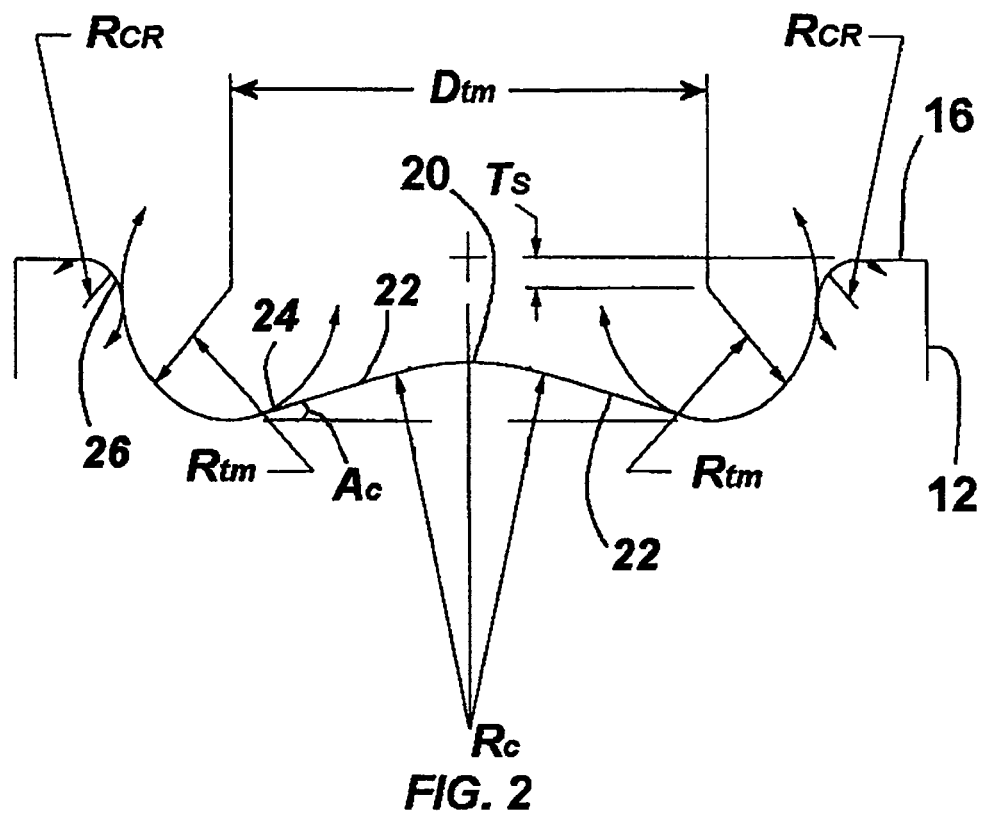
FIG. 2 illustrates a piston having a bowl geometry including a toroidal surface according to one presently preferred embodiment of the present invention.

As shown in FIG. 2, the top wall 16 of the piston defines a cavity. The cavity includes a center portion 20 having a partially spherical shape. Preferably, the center portion has a spherical radius $R_c$ of about three inches. A cone portion 22 is connected to the center portion 20 and preferably is formed at an angle $A_c$ of about 14 degrees. An annular toroidal surface 24 is formed adjacent to the cone portion 22 and is defined in part by a toroidal major diameter $D_{tm}$ of about 4.822 inches and a toroidal minor radius $R_{tm}$ of about 0.77 inches. A crown rim 26 is formed adjacent to the annular toroidal surface 24 and is connected to an upper flat rim face of sidewall 12. The crown rim 26 preferably has a radius $R_{CR}$ of about 0.38 inches.

The annular toroidal surface 24 is preferably formed wherein the toroidal minor radius is measured from a point that is submerged approximately 0.496 inches below the upper flat rim face. This is also known as the toroidal submersion below squish land and is denoted as $T_s$ in FIG. 2. Preferably a piston 10 having a bowl configuration as described above would have a bowl volume of approximately 35.185 cubic inches.

Figure 3:
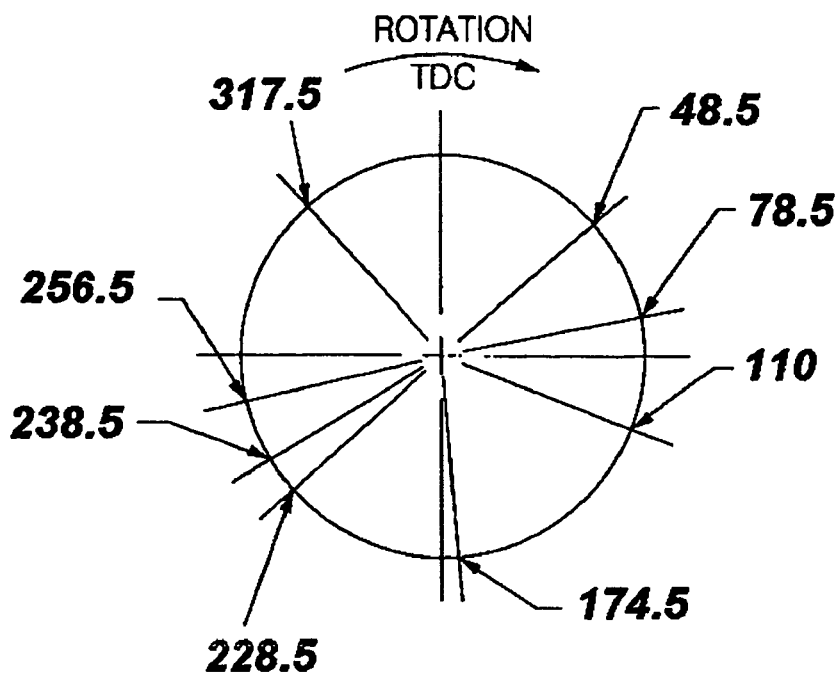
FIG. 3 is a camshaft timing diagram illustrating the timing sequence of one presently preferred embodiment of the present invention.

One unique feature of the above-stated dimensions provides the ability to retard injection timing of the engine to lower emission while meeting smoke criterion and optimizing fuel economy. In the fuel injection camshaft lobe, changes were made to the lobe to ensure that optimum injection pressure was realized. By phasing the camshaft to the correct position, an optimum location favorable from emission and fuel economy standpoint was discovered. Additional changes to the exhaust cam lobe were made to improve lower $NO_x$ emission. From the tests it was found that phasing the camshaft as schematically, illustrated in FIG. 3 provided benefits in reducing $NO_x$ emissions. FIG. 3 provides a schematic representation of camshaft timing angles according to one embodiment of the present invention. The angular representation of FIG. 3 as described below is base on degrees of rotation from top dead center.

The centerline of the injector cam is at 48.5 degrees. The start of the exhaust profile is at 78.5 degrees. The valve open 0.026-inch lift occurs at 110 degrees. The max valve lift occurs at 174.5 degrees. The injection profile ends at 228.5 degrees. The valve close 0.026-inch lift occurs at 238.5 degrees. The end of the exhaust profile occurs at 256.5 degrees. The start of the injection profile occurs at 317.5 degrees.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A diesel engine comprising:
   a piston having a top wall and an annular sidewall; said top wall including an upper rim face, said top wall defining a cavity including a center portion having a partially spherical shape and a spherical radius of about 3 inches, a cone portion adjacent to said center portion and being formed at an angle of about 14 degrees, an annular toroidal surface connected to said cone portion and defined by a toroidal major diameter of about 4.822 inches and a toroidal minor radius of about 0.77 inches, a crown rim having a radius of about 0.38 inches and being adjacent to said annular toroidal surface and connected to said upper rim face of said annular sidewall, said crown rim joining the annular toroidal surface at a location having a diameter not less than about the toroidal major diameter plus two times the toroidal minor radius, said toroidal minor radius being measured from a point that is submerged about 0.496 inches below said upper rim face, said cavity having a bowl volume of about 35.185 cubic inches.

2. A piston comprising:

a top wall and an annular sidewall, said top wall including an upper rim face, said top wall defining a cavity including a center portion having a partially spherical shape, the center portion having a spherical radius of about 3 inches;

a cone portion adjacent to said center portion, said cone portion being formed at an angle of about 14 degrees;

an annular toroidal surface connected to said cone portion and defined by a toroidal major diameter and a toroidal minor radius, said toroidal major diameter being about 4.822 inches, said toroidal minor radius being about 0.77 inches, wherein said toroidal minor radius is measured from a point that is submerged about 0.496 inches below said upper rim face; and a crown rim adjacent to said annular toroidal surface and connected to said upper rim face of said annular sidewall, said crown rim joining the annular toroidal surface at a location having a diameter not less than about the toroidal major diameter plus two times the toroidal minor radius, and wherein said cavity has a bowl volume of about 35.185 cubic inches.

* * * * *